Aug. 31, 1937.  R. HOFSTETTER  2,091,362
CLUTCH CONTROL MECHANISM
Filed Aug. 14, 1935
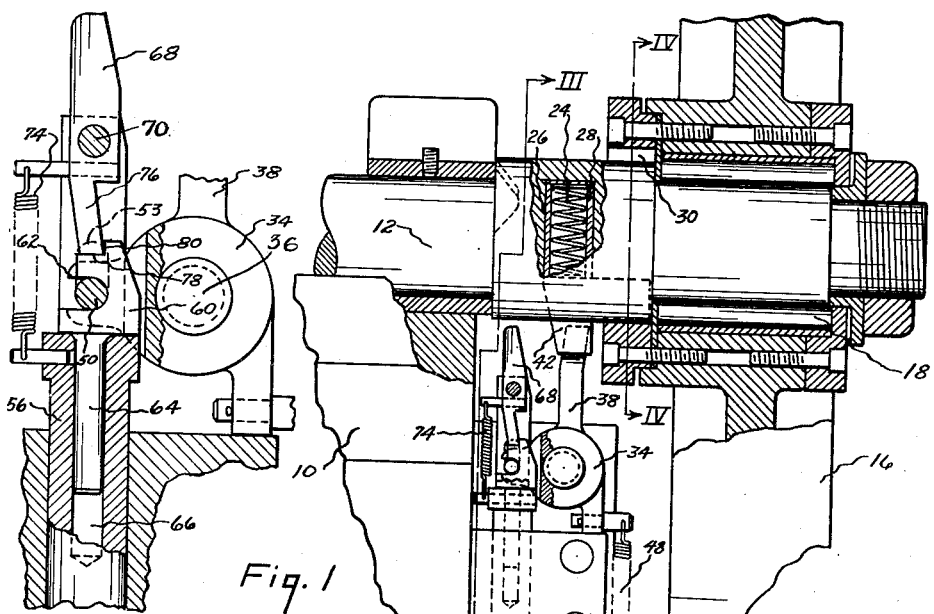
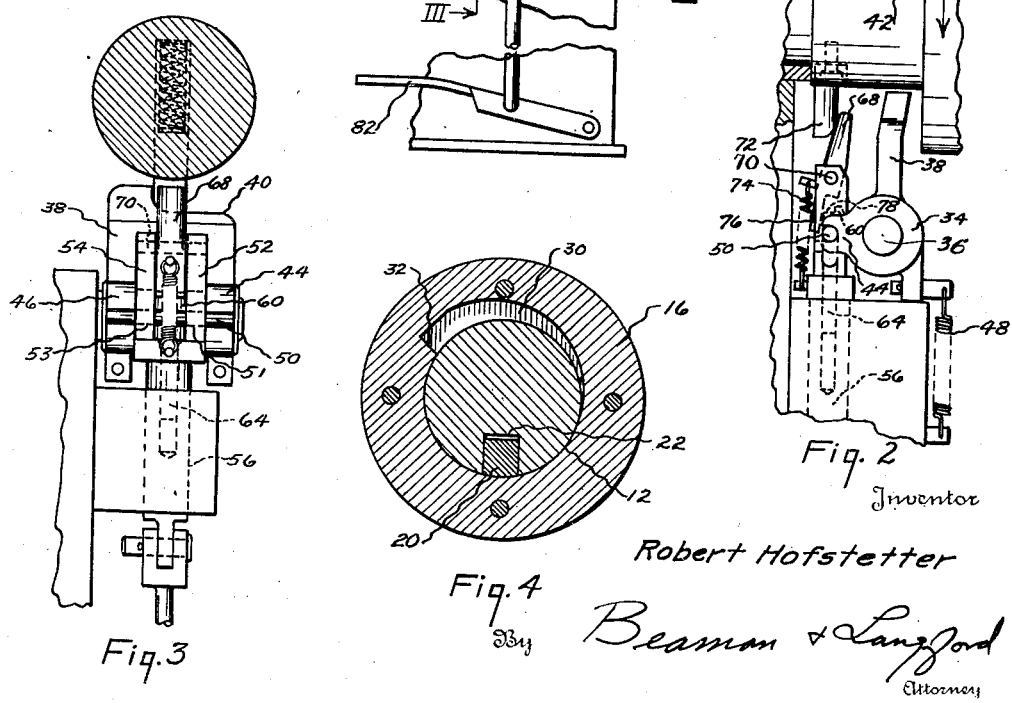
Inventor
Robert Hofstetter
By Beaman & Langford
Attorneys Patented Aug. 31, 1937

2,091,362

UNITED STATES PATENT OFFICE 2,091,362

CLUTCH CONTROL MECHANISM

Robert Hofstetter, Jackson, Mich., assignor to Tomkins-Johnson Company, Jackson, Mich., a corporation of Michigan Application August 14, 1935, Serial No. 36,061

5 Claims. (Cl. 192—28)

The present invention relates to improvements in clutch operating mechanism for power presses, riveting machines, and similar equipment in which the cycle of operation is generally controlled by the operator actuating a foot treadle or equivalent structure.

Heretofore innumerable arrangements have been proposed to prevent an unintentional repetition of a cycle of operation of a machine due to the failure of the operator to properly remove his foot from the clutch control treadle at the completion of a single cycle of operation. The present invention relates to simple and effective structure for preventing a repeat operation, and necessitates the raising and lowering of the foot treadle each cycle of an operation of the machine.

Objects of the invention reside in the combination and arrangement and construction of parts for accomplishing the above stated results, as will be more fully set forth hereinafter, and particularly defined in the appending claims.

In the drawing, wherein the preferred form of the invention is illustrated,

Fig. 1 is a fragmentary side elevation view of a machine embodying the present invention, Fig. 2 is a view similar to Fig. 1, showing the clutch operating mechanism in a releasing position, Fig. 3 is a view taken on line III—III of Fig. 1 of the clutch operating and releasing mechanism, Fig. 4 is a cross sectional view taken on line IV—IV of Fig. 1 through the clutch mechanism, and Fig. 5 is an enlarged fragmentary view of the releasing latch and switch mechanism.

Referring to the drawing, reference character 10 indicates the frame structure of a machine tool such as a power press, riveting machine, etc., having a driven shaft 12 rotatably supported therein in any suitable manner. At the outer end 14 of the shaft 12 a continuously driven fly wheel generally designated 16 is supported for free rotation upon suitable bearings 18. While numerous types of known clutch mechanisms may be used in connection with the present invention, I have shown one well known construction comprising a clutch dog 20 radially slidable in the recess 22 in the shaft 12. A spring 24, housed within a bore 26 in which an extended portion 28 of the dog 20 is guided, acts to continuously urge the clutch dog 20 radially outward into the helical groove 30, terminating with the abutment 32. It will be understood that as long as the clutch dog 20 is supported in the position shown in Fig. 4, the fly wheel 16 will freely rotate relative to the shaft 12. However, when the dog 20 is released to the action of the spring 24, the same will be projected radially outward into the groove 30, and upon engagement with the abutment 32 the fly wheel 16 and shaft 12 will rotate as a unit.

The clutch operating mechanism comprises a switch plate 34 supported upon a shaft 36 upon the framework 10. An upright extension 38 terminates in a cam surface 40 which the projection 42 of the clutch dog 20 rides over to withdraw the clutch dog 20 from the groove 30 to declutch the shaft 12 and fly wheel 16 at the end of each cycle of operation. In the embodiment shown the switch plate 34 takes the form of a pair of forked laterally extending arms 44 and 46 merging into the inverted U-shaped construction of the extension 38, as more clearly shown in Fig. 3. A spring 48 suitably connected to the switch 34 tends to position the same in the path of the projection 42. For rocking the switch 34 counterclockwise from the position shown in Fig. 1 to permit the spring 24 to project the clutch dog 20 out into the groove 30 and into engagement with the abutment 32, a pin 50 is received within the forked ends of the arms 44 and 46. This pin 50 extends through elongated slots 51 and 53 in the spaced arms 52 and 54 of the forked treadle operated rod 56. As more clearly shown in Fig. 5, a member 60 having a slotted portion 62 and a stem 64 guided in a bore 66 of the rod 56 embraces the pin 50 and is movable therewith, the stem 64 being freely guided in the bore 66 and the slots 51 and 53 functioning to guide the pin 50 and to permit relative movement between the forked rod 56 and the member 60.

A latch 68 is freely pivoted upon the pin 70 supported at the upper ends of the arms 52 and 54 of the forked rod 56. The upper end of the latch is normally disposed in the path of the knock off cam 72, located upon the shaft 12, under the tension of the spring 74. Referring particularly to Fig. 5, the lower end 76 of the latch 68 seats upon the upper end at 78 of the member 60 and is urged against a stop 80. When the member 68 is in the position shown in Fig. 5, the lower end 76 constitutes a push bar for rocking the switch plate 34 and the extension 38 from supporting position under the projection 42 to clutch the shaft 12 and fly wheel 16 together. When the latch 68 is axially aligned with the rod 56 and the foot treadle 82 depressed, the lower end 76 acting through the seat 78 causes the member 60 to lower as a unit with the rod 56. As the pin 50 follows the movement of the member 60, the switch plate 34 will be actuated counterclockwise to initiate the cycle of operation. With the treadle 82 depressed by the operator, partial rotation of the shaft 12 brings the knock off cam 72 into engagement with the latch 68 and the latter is rocked clockwise, destroying the push bar linkage between the rod 56 and the switch plate 34. When this happens, with the lower end of 68 rocked from the seat 78, the switch plate 34 assumes its initial position and the member 60 assumes the position shown in Fig. 2, all due to the action of the spring 48. From inspection of Fig. 2 it will appear that the seat 78 is positioned to one side of the end portion 76, and will position the same in the position shown against the tension of the spring 74 until the pressure of the operator's foot is removed from the treadle 82. With the linkage broken by rocking the latch 68 by the cam 72, the cam surface 40 is in a position to declutch the shaft 12 from the fly wheel 16, completing the cycle of operation. It should now become apparent that in order for the next cycle of operation to be initiated, that the operator must first remove his foot pressure, permitting the rod 56 to be lifted by the usual spring (not shown) sufficiently for the lower end 76 of the latch 68 to occupy the position shown in Fig. 5 upon the seat 78. As the rod 56 is raised from the position shown in Fig. 2, the spring 74 will urge the portion 76 sidewise into position upon the seat 78 and against the stop 80. Without further detailed description of the operation, it should be clear that repeated occurrence of the cycle of operation cannot take place, due to the operator's carelessness in failing to remove his foot pressure, and that the foot treadle must be raised and lowered each cycle of operation.

Having described my invention, what I claim as patentable and desire to protect by Letters Patent is:

1. In a non-repeating clutch operating mechanism for devices of the class described, the combination with a rockable clutch shifter, manually operable means for actuating said shifter, said means including a manually reciprocable rod having at its upper end a shiftable latch normally in axial alignment with said rod and movable therewith as a unit, said latch being automatically shifted out of axial alignment with said rod each cycle of operation, a member located beneath the lower end of said latch and in axial alignment with said rod and movable with said rod as a unit with said latch in axial alignment with said rod, said member and shifter being interconnected whereby said shifting member is actuated by movement of said rod with said latch in said axial alignment, said member, with said latch moved out of axial alignment during the cycle of operation, being relatively movable with respect to said rod breaking the operative relation between said shifter and said rod, said operative relation being only reestablished between said shifting member and said rod upon return movement of said rod to its original position following completion of the cycle of operation.

2. In a non-repeating clutch operating mechanism for devices of the class described, the combination of a rockable clutch shifter, means including a rod moved in one direction to rock said shifter from one position to another, a pivoted latch located at the upper end of said rod and having portions above and below its pivot normally in axial alignment with said rod, said latch portions each cycle of operation being moved out of axial alignment means positioned beneath the lower of said latch portions and axially associated with said rod and movable as a unit therewith and relative thereto depending upon the position of said lower latch portion, and interconnections between said shifter and said means.

3. In a non-repeating clutch operating mechanism for devices of the class described, the combination with a clutch shifter, manually operable means for actuating said shifter, said means including a reciprocable rod, a pivoted latch supported at the upper end of said rod, a member guided on said rod for movement relative thereto, said latch having portions above and below its pivot and normally disposed in axial alignment with said rod with the lower portion of said latch disposed over said member, said member in one position being engaged by said lower portion of said latch so as to be movable with said rod as a unit, connections between said member and said shifter whereby said shifter is actuated by movement of said rod with said latch engaging with said member, said member with said latch in a disengaging position moving relative to said rod under the influence of said shifter, the engagement between said latch and said member being established only upon movement of said rod to its original position following each cycle of operation.

4. In a non-repeating clutch operating mechanism for devices of the class described, the combination of a clutch shifter, a manually operable means for actuating said shifter, said means including a rod moved from one position to another to actuate said shifter to initiate the cycle of operation, a shiftable pivoted latch carried adjacent the upper end of said rod and having portions extending above and below its pivot and normally in axial alignment with said rod, intermediate means interposed below the lower portion of said latch and between said latch and said shifter, said intermediate means with said lower portion of said latch in axial alignment with said rod moving with said rod as a unit to actuate said shifter, said intermediate means with said lower portion of said latch out of axial alignment with said rod being movable relative to said rod under the influence of said shifter, the unitary relation between said rod and said intermediate means being only reestablished upon the return of said rod to its original position following each cycle of operation.

5. In a non-repeating clutch operating mechanism for devices of the class described, the combination with a rockable clutch shifter, manually operable means for actuating said shifter, said means including a rod having a forked upper end, a latch carried by said forked rod supported for swinging movement between the spaced arms thereof, said clutch shifter being supported for rocking movement adjacent the path of movement of said rod and having a portion projecting into and received within said forked upper end, and means constituting an operative connection between said shifter and said latch in one position for rocking said shifter on movement of said rod.

ROBERT HOFSTETTER.